L. WILLIS.
MOUNTING THE TEETH OR BLADES OF AGRICULTURAL IMPLEMENTS.
APPLICATION FILED JULY 25, 1916.

1,213,566. Patented Jan. 23, 1917.

INVENTOR
LELAND WILLIS
BY HIS ATTORNEY
Harry Smith

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

MOUNTING THE TEETH OR BLADES OF AGRICULTURAL IMPLEMENTS.

1,213,566.     Specification of Letters Patent.     Patented Jan. 23, 1917.

Application filed July 25, 1916. Serial No. 111,147.

*To all whom it may concern:*

Be it known that I, LELAND WILLIS, a citizen of the United States, residing in Grenloch, New Jersey, have invented certain Improvements in Mounting the Teeth or Blades of Agricultural Implements, of which the following is a specification.

My invention consists of a device for clamping a soil-stirring tooth or blade to the frame of an agricultural implement, the device being characterized by the fewness and cheapness of its parts and by the firmness of its hold upon the stem or shank of the tooth or blade.

Figure 1:
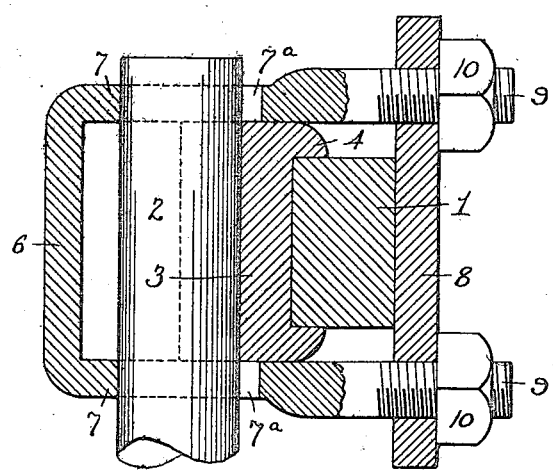
Figure 2:
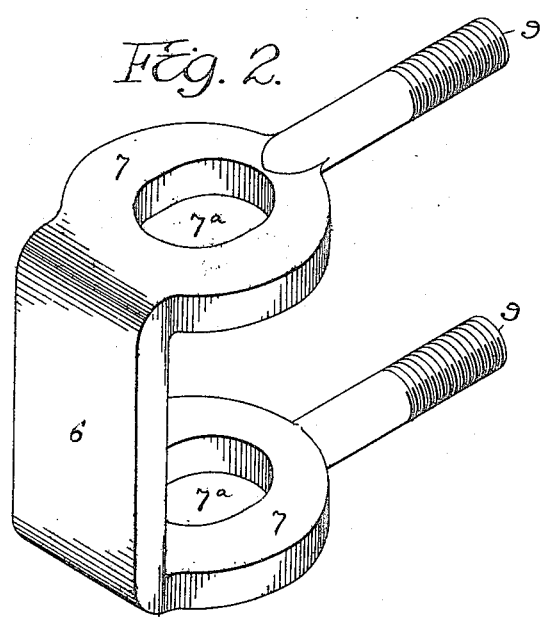
Figure 3:
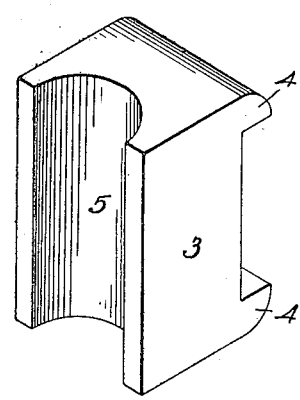

In the accompanying drawing—Figure 1 is a view, partly in vertical section and partly in elevation, of a clamping device in accordance with my invention, and Figs. 2 and 3 are perspective views, respectively, of a clamping yoke and block constituting the principal elements of said device.

In the drawing, 1 represents a frame bar of an agricultural implement and 2 the shank of a tooth or blade which is to be clamped thereto. Between the bar and the inner face of the shank 2 is interposed a block 3 having at top and bottom projecting flanges 4 which overlap, respectively, the top and bottom faces of the frame bar 1, the outer face of said block 3 being recessed, as shown at 5 in Fig. 3, to form a seat for the inner face of the shank 2. In connection with said seat block is employed a yoke comprising a vertical member 6 and horizontal top and bottom members 7 integral therewith, said horizontal members having formed therein openings 7ª for the reception of the shank 2 at points above and below the block 3. The upper and lower members of the yoke extend inwardly beyond the block 3 and frame bar 1, above and below the latter, and also through transverse openings in a clamping bar 8 which bears against the inner face of the frame bar 1, the inner ends of said upper and lower members of the yoke being threaded, as shown at 9, for the reception of nuts 10 which bear upon the inner face of the clamping bar 8 and, when tightened, serve to press the outer face of said clamping bar firmly against the inner face of the frame bar 1 and, at the same time, to draw the forward faces of the openings 7ª of the yoke firmly into contact with the outer face of the shank 2 and thereby press the inner face of the same firmly against its seat in the block 3. This clamping device is characterized by cheapness and simplicity of construction, as it comprises but three parts neither of which requires in its preparation any machine work except the threading of the ends of the upper and lower members of the yoke, the nuts 10 being ordinary stock nuts to be found in any agricultural implement works.

The seat 5, formed in the block 3, provides a frictional bearing of considerable vertical dimensions for the inner face of the shank 2, and, as the block is vertically confined to the frame bar by means of the overlapping flanges 4, the rigid vertical confinement of the tooth to the frame bar is insured.

I claim:—

In a device for clamping the shank of a tooth or blade of an agricultural implement to a frame bar thereof, the combination of said bar, the shank, a block interposed between said bar and shank, said block having one face for bearing against a side of the bar, an opposite face recessed to form a seat for the reception of one side of the shank, and flanges overlapping the top and bottom faces of the frame bar, a clamp bar on the opposite side of the frame bar from the block, said bar having transverse openings therethrough above and below the frame bar, and a yoke comprising a vertical member and upper and lower horizontal members integral therewith, and having vertical openings therethrough and threaded ends projecting through the transverse openings in the clamp bar, and nuts engaging said threaded ends, the outer faces of the openings in the horizontal members of the yoke bearing against the outer face of the shank and serving to press the inner face of the same against its seat in the block.

In testimony whereof, I have signed my name to this specification, in the presence of two subscribing witnesses.

LELAND WILLIS.

Witnesses:
  HUGH KEMP,
  L. C. REEVE.

Copies of this patent may be obtained for five cents each, by addressing the "Commissioner of Patents, Washington, D. C."